United States Patent

Totschnig

[15] 3,687,243
[45] Aug. 29, 1972

[54] POWER TRANSFER ELEMENT WITH AUTOMATICALLY ACTING DEVICE FOR THE ADJUSTMENT OF LENGTH FOR MAINTAINING A PREDETERMINED CLEARANCE, ESPECIALLY FOR READJUSTMENT OF THE VENTILATING PLAY IN THE CASE OF BRAKES

[72] Inventor: Manfred Karl Totschnig, Wolfsburg, Germany

[73] Assignee: Volkswagenwerk Aktiengesellschaft, Wolfsburg, Germany

[22] Filed: Aug. 20, 1970

[21] Appl. No.: 65,365

[30] Foreign Application Priority Data

Sept. 3, 1969    Germany..........P 19 44 586.4

[52] U.S. Cl. .............................................. 188/196 D
[51] Int. Cl. ............................................... F16d 65/56
[58] Field of Search..188/71.8, 71.9, 79.5 GE, 196 D

[56] References Cited

UNITED STATES PATENTS

| | | | |
|---|---|---|---|
| 2,949,173 | 8/1960 | Peras | 188/71.9 X |
| 3,244,260 | 4/1966 | Frayer | 188/71.9 X |

FOREIGN PATENTS OR APPLICATIONS

| | | | |
|---|---|---|---|
| 1,294,718 | 4/1962 | France | 188/71.9 |

*Primary Examiner*—Duane A. Reger
*Attorney*—Watson, Cole, Grindle & Watson

[57] ABSTRACT

Power transmitting element having an automatically acting device for adjustment of length for stabilization of a predetermined idle path with an adjusting element movable axially in one direction and stopped in the other axial direction by a backstop, for adjustment of play in brakes.

8 Claims, 1 Drawing Figure

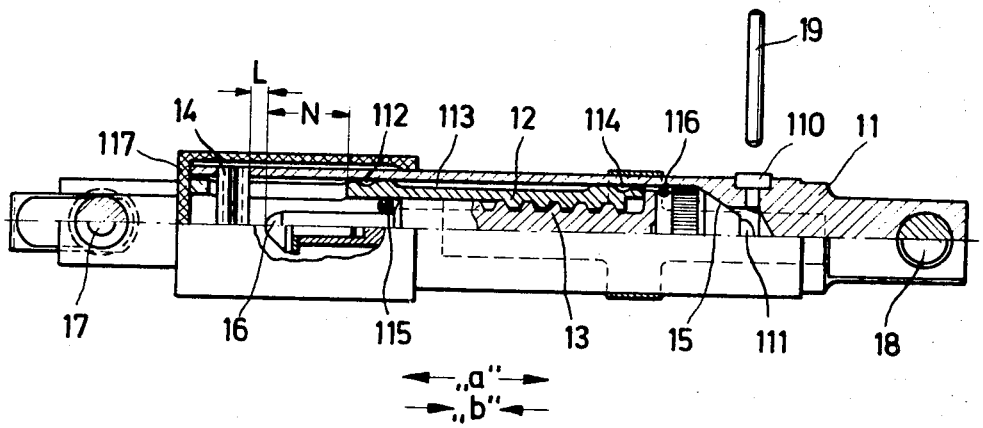

POWER TRANSFER ELEMENT WITH AUTOMATICALLY ACTING DEVICE FOR THE ADJUSTMENT OF LENGTH FOR MAINTAINING A PREDETERMINED CLEARANCE, ESPECIALLY FOR READJUSTMENT OF THE VENTILATING PLAY IN THE CASE OF BRAKES

This invention relates to a power transfer element with an automatically acting device for adjustment of length for stabilization of a predetermined idle path with an adjusting element movable in relation to a main part axially in one direction and stopped in the other axial direction by means of a backstop, especially for readjustment of the ventilating play in the case of brakes.

In the case of a known arrangement of this type, the journal, "L'usine nouvelle," No. 29 of July 16, 1959, the force acting in one direction is transferred to the slanting surfaces of two wedge elements by means of two cylindrical rollers touching along a generatrix. Said rollers as a result thereof, are pressed with their outside surfaces against a parallel construction and, by their friction with the parallel construction, they prevent a change in length of the power transmission element. In the case of a power effect in the opposite direction, the friction brake becomes ineffective by means of a spring system so that now the desired change in length can be accomplished.

In the case of this known power transmitting element and subject to the flat wedge angles, great forces in a transverse direction develop. In order to be able to absorb these forces large cross sections of the loaded elements are needed which in turn require great weight. The great forces result in high surface pressures which require a hardening of the wedge surfaces. The sensitivity to tolerance, likewise conditional on the flat wedge angles, requires a very precise fabrication.

The installation of a constant length into the power transmission element, in which a change of length in both directions is possible, it cannot be carried out because as a matter of principle the device operates without an idle path. In the case of brakes which have been equipped with such a power transmitting element, the influence of the ventilating play must be taken into account elsewhere.

For reasons of strength it is likewise not possible to construct the known arrangement so small that it can also be used in smaller brakes.

This invention is based on the object of constructing a power transmission element which adapts itself better to the particular purpose of its use, particularly as a readjusting device. It is expected to save space and weight without any limitation of its effective functioning and safety in operation and, with regard to production, it is supposed to be particularly suitable for mass production.

According to the invention, this will be achieved by the adjusting element being axially freely movable by the amount of the idle path and, as compared to the main element, and that a collet and male screw engaging with the collet with a thread without automatic locking serve as a device for the adjustment in length whereby a part of said device for the adjustment of length is rotatable and shiftable axially by means of a stop in one end position upon exceeding the idle path and in relation to the other part, and by a rotational safety device assigned to the rotatable element and effective in the other end position, after return movement of the adjusting element by the idle path.

Advantageously, the thread of the collet and the male screw is developed as a trapezoidal thread because the latter is well suited on the one hand as a thread of movement and on the other hand, from the point of view of fabrication, it can be produced without difficulty.

In a further development of the invention, a friction brake serves as a safety device against rotation which softly absorbs the torque that is to be transferred in a locking direction. At the same time one will be able to achieve with it in a simple manner, a continuous adjustment in length.

In order to achieve an increased braking effect or else to build in more space saving which is to say, the same thing, the friction brake may be developed as a cone brake.

Further objects of the invention will be apparent from the following description when considered in connection with the accompanying drawings in which;

The FIGURE is a part longitudinal section and part side view of the power transmitting element developed as a pressing rod.

Referring to the FIGURE of the drawing, the pressing rod consists essentially of a main element 11, the adjusting element 12 in the form of a threaded sleeve, the male screw 13 and the tightening pin 14. The thread in elements 12 and 13 is a trapezoidal thread with a steep pitch lying outside the automatic locking. The male screw 13 at its right hand end together with the main element 11 has been formed as a cone brake 15.

In the case of a longitudinal movement of the main element 11 and of the adjusting element 12 in the direction "a," free wheeling direction, the male screw 13 is pressed against the stop 14 after the idle path or space L has been exceeded. In the case of a further effect of the traction force, the male screw begins to turn, since the friction moment along the point of contact between the tightening pin 14 and the sphere-shaped front side 16 of the male screw is smaller than the torque produced by the male screw and thus makes possible a further extension in length of the power transmitting element.

An axial movement in both directions is possible by the amount of the idle path L. The maximum readjusting path N as well as idle path L are constructionally conditional and to a large extent are freely selectable.

In the case of an axial movement of the main element 11 and the adjusting element 12 in direction "b," locking effect, the front side 16 is freed of the stop 14. Main element and adjusting element can now be pushed together by or to the extent of the idle path L, since the cone brake 15 becomes then effective. The angle of pitch of the trapezoidal thread must be selected in dependence on the angle of the cone, such that the braking moment will be greater than the torque produced by the male screw. The reaction moment is absorbed by the tightening pin 14 or by the places of attachment 17 and 18.

It will be possible by means of a return peg or pin 19, which is pushed into the bore of the main element 11 provided for this purpose, instead of the locking plug 110 and which acts on the likewise ball-shaped front surface 111 of the male screw constructed in regard to measurements in such a way that the cone brake 15 becomes ineffective at the same time to move the parts 11 and 12 toward each other also in direction "b," possibility of readjustment.

The recesses 112, 113 and 114 are grease grooves in order to achieve improved sliding properties of the threaded sleeve 12 in the main element 11.

Numerals 115 and 116 designate gaskets under prestress which besides their actual sealing objective, will simultaneously prevent the male screw from turning under the influence of oscillations.

The plug 110 and the protective cup 117 will prevent the penetration of dirt inside the pressing rod.

I claim:

1. Power transfer element with automatically acting length equalizing device for maintaining a predetermined clearance constant, with an adjusting element movable relative to a main part axially in one direction and restrainable by means of a return lock in the other axial direction, especially for the readjustment of the ventilation clearance in the case of rakes, wherein the adjusting element is freely movable axially by the clearance dimension relative to the main part, and wherein a thread casing and a threaded spindle, having reversible threaded engagement therein, serve as the length equalizing device, and wherein the threaded spindle is rotatable and in one terminal position, after having exceeded the clearance, is axially shiftable relative to the thread casing by means of a stop, and wherein a rotational safety element effective in the other terminal position, after return movement of the adjusting element, has been adjoined to the threaded spindle, characterized in that a peg which can be introduced in the area of the rotational safety element through an opening in the main part makes the rotational safety element ineffective, so that it is possible for the adjusting element to be returned without relative rotation of the main part and the thread casing.

2. Power transfer element according to claim 1, characterized in that the main part is constituted by a casing in which the adjusting element consisting of the thread casing and the threaded spindle is mounted, and wherein means are provided to prevent relative rotation of casing and thread casing.

3. Power transfer element according to claim 2, characterized in that the last means serves also as a stop for the threaded spindle.

4. Power transfer element according to claim 3, characterized in that the end of the threaded spindle facing the stop is spherical.

5. Power transfer element according to claim 1, characterized in that the terminal area of the threaded spindle facing away from the stop and developed as a cone rake serves together with the main part as the rotational safety element.

6. Power transfer element according to claim 1, characterized in that the end of the threaded spindle facing away from the stop is spherical.

7. Power transfer element according to claim 1, characterized in that between the threaded spindle and the thread casing on the one hand and between the threaded spindle and the main part on the other hand, additional means have been provided to prevent an undesired readjustment, for example, as a result of shocks during driving.

8. Power transfer element according to claim 7, characterized in that the additional means consist of sealing rings.

* * * * *